US 11,683,610 B2

(12) United States Patent
Saito et al.

(10) Patent No.: US 11,683,610 B2
(45) Date of Patent: Jun. 20, 2023

(54) PHOTOELECTRIC CONVERTER, PHOTOELECTRIC CONVERSION SYSTEM, MOVING BODY, AND SEMICONDUCTOR SUBSTRATE

(71) Applicant: CANON KABUSHIKI KAISHA, Tokyo (JP)

(72) Inventors: Kazuhiro Saito, Tokyo (JP); Kohichi Nakamura, Kanagawa (JP); Tetsuya Itano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/590,895

(22) Filed: Feb. 2, 2022

(65) Prior Publication Data
US 2022/0247959 A1   Aug. 4, 2022

(30) Foreign Application Priority Data

Feb. 4, 2021 (JP) .............. JP2021-016893

(51) Int. Cl.
H04N 25/70 (2023.01)
H04N 25/75 (2023.01)
H04N 25/79 (2023.01)

(52) U.S. Cl.
CPC ............ H04N 25/75 (2023.01); H04N 25/79 (2023.01)

(58) Field of Classification Search
None
See application file for complete search history.

(56) References Cited

U.S. PATENT DOCUMENTS

| 7,462,810 | B2 | 12/2008 | Kobayashi et al. |
| 7,528,878 | B2 | 5/2009 | Sato et al. |
| 9,029,752 | B2 | 5/2015 | Saito et al. |
| 9,083,906 | B2 | 7/2015 | Nakamura et al. |
| 9,232,165 | B2 | 1/2016 | Saito et al. |
| 9,288,415 | B2 | 3/2016 | Yamazaki et al. |

(Continued)

FOREIGN PATENT DOCUMENTS

| EP | 2889908 A1 | 7/2015 |
| JP | 2004-015208 A | 1/2004 |

(Continued)

OTHER PUBLICATIONS

U.S. Appl. No. 17/590,007, filed Feb. 1, 2022 (First Named Inventor: Tetsuya Itano).

(Continued)

Primary Examiner — Mark T Monk
(74) Attorney, Agent, or Firm — Venable LLP

(57) ABSTRACT

A photoelectric converter includes a pixel array including a plurality of pixels, a capacitive coupling amplifier configured to amplify a signal output from the pixel array, and a delta-sigma AD converter configured to convert, into a digital signal, an analog signal output from the amplifier. The amplifier is formed by a plurality of first elements including an active element and a capacitive element. The delta-sigma AD converter is formed by a plurality of second elements including an active element and a capacitive element. A breakdown voltage of at least one of the plurality of second elements forming the delta-sigma AD converter is lower than a breakdown voltage of the plurality of first elements forming the amplifier.

25 Claims, 15 Drawing Sheets

(56) References Cited

U.S. PATENT DOCUMENTS

| | | | |
|---|---|---|---|
| 9,602,752 | B2 | 3/2017 | Kobayashi et al. |
| 9,602,753 | B2 | 3/2017 | Saito et al. |
| 10,057,529 | B2 | 8/2018 | Saito et al. |
| 2004/0080629 | A1 | 4/2004 | Sato et al. |
| 2014/0293103 | A1 | 10/2014 | Wakabayashi et al. |
| 2016/0227141 | A1 | 8/2016 | Kobayashi et al. |
| 2016/0308553 | A1 | 10/2016 | Mitani et al. |
| 2019/0020841 | A1* | 1/2019 | Osawa ................ H04N 25/772 |
| 2021/0021782 | A1 | 1/2021 | Sato et al. |

FOREIGN PATENT DOCUMENTS

| | | |
|---|---|---|
| JP | 2013-090234 A | 5/2013 |
| JP | 2015-126043 A | 7/2015 |
| WO | 2015/098057 A1 | 7/2015 |

OTHER PUBLICATIONS

U.S. Appl. No. 17/590,887, filed Feb. 2, 2022 (First Named Inventor: Kohichi Nakamura).

U.S. Appl. No. 17/693,597, filed Mar. 14, 2022 (First Named Inventor: Tetsuya Itano).

* cited by examiner

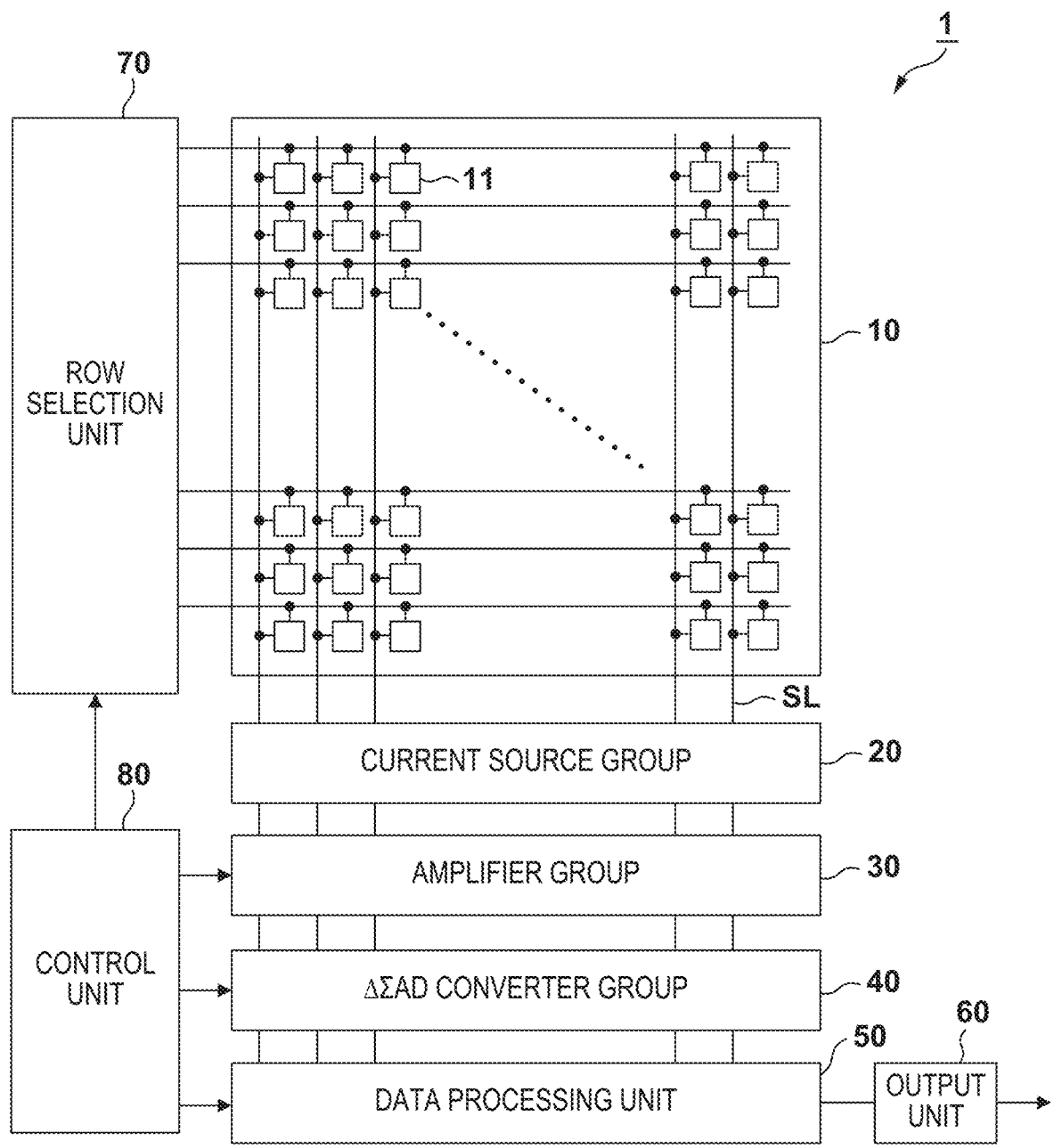

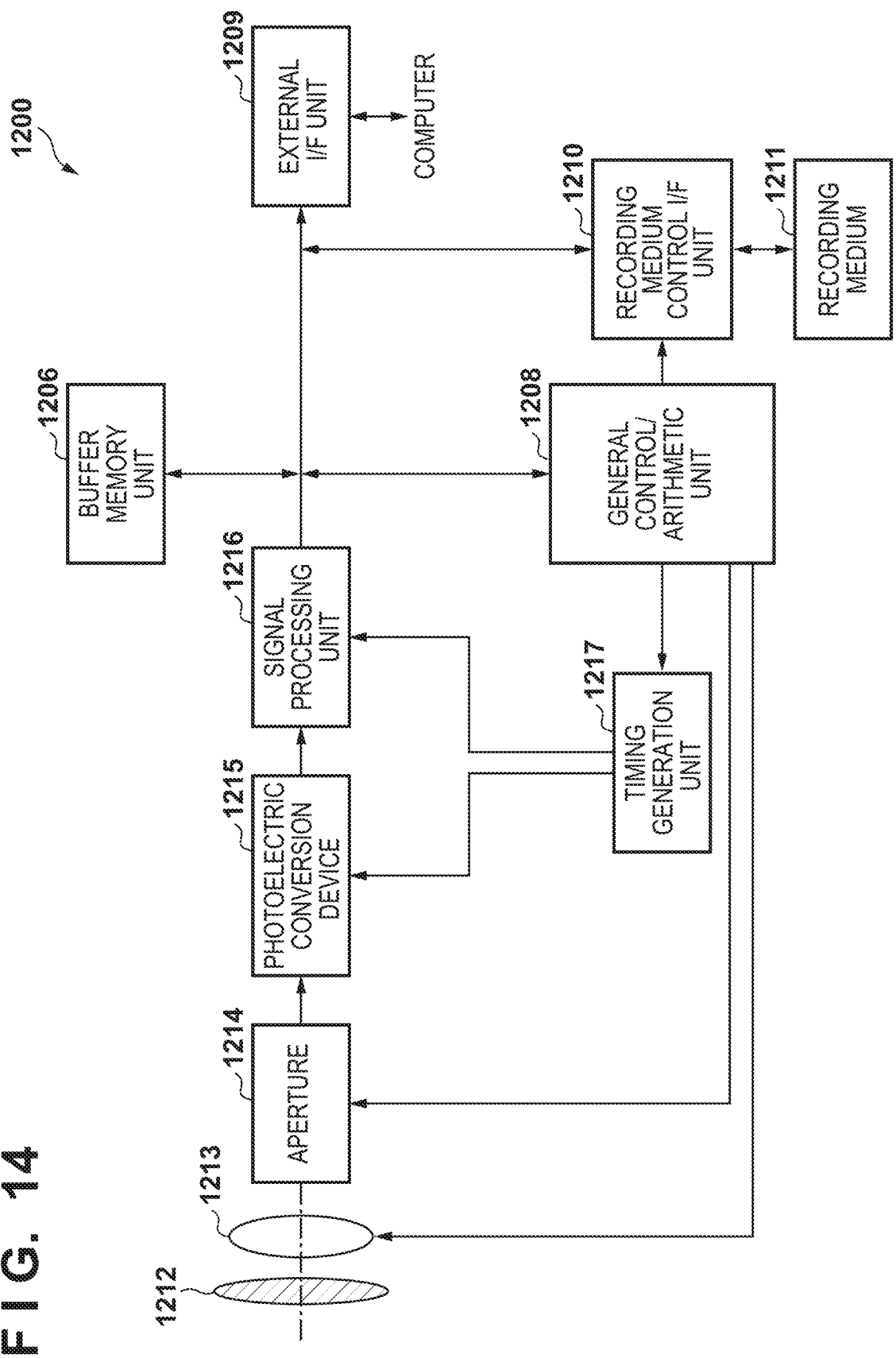

PHOTOELECTRIC CONVERTER, PHOTOELECTRIC CONVERSION SYSTEM, MOVING BODY, AND SEMICONDUCTOR SUBSTRATE

BACKGROUND OF THE INVENTION

Field of the Invention

The present invention relates to a photoelectric converter, a photoelectric conversion system, a moving body, and a semiconductor substrate.

Description of the Related Art

Japanese Patent Laid-Open No. 2013-90234 describes a solid-state image sensor including a column circuit with a delta-sigma AD converter. The column circuit includes an amplifier connected to a signal line driven by a pixel and the delta-sigma AD converter for AD-converting an output from the amplifier. The delta-sigma AD converter includes a delta-sigma modulator and a decimation filter circuit. The pixel is driven by an analog power supply, and the amplifier and the delta-sigma AD converter are driven by a digital power supply. Alternatively, depending on the amplitude level of the pixel, the amplifier is driven by a power supply whose voltage is higher than that of the digital power supply, for example, by the analog power supply.

In the overall photoelectric converter or solid-state image sensor including pixels and a circuit for reading out a signal from each pixel, it is advantageous to share the structure of a transistor and a capacitive element in order to simplify the design and process. On the other hand, such sharing may be disadvantageous in speeding up readout of the signal from each pixel.

SUMMARY OF THE INVENTION

The present invention provides a technique advantageous in speeding up readout of a signal from each pixel.

One of aspects of the present invention provides a photoelectric converter comprising: a pixel array including a plurality of pixels; a capacitive coupling amplifier configured to amplify a signal output from the pixel array; and a delta-sigma AD converter configured to convert, into a digital signal, an analog signal output from the amplifier, wherein the amplifier is formed by a plurality of first elements including an active element and a capacitive element, the delta-sigma AD converter is formed by a plurality of second elements including an active element and a capacitive element, and a breakdown voltage of at least one of the plurality of second elements forming the delta-sigma AD converter is lower than a breakdown voltage of the plurality of first elements forming the amplifier.

Further features of the present invention will become apparent from the following description of exemplary embodiments with reference to the attached drawings.

BRIEF DESCRIPTION OF THE DRAWINGS

FIG. 1 a block diagram showing the arrangement of a photoelectric converter according to an embodiment;

FIG. 14 is a block diagram showing an example of the arrangement of a photoelectric conversion system according to the embodiment;

DESCRIPTION OF THE EMBODIMENTS

Figure 2A:
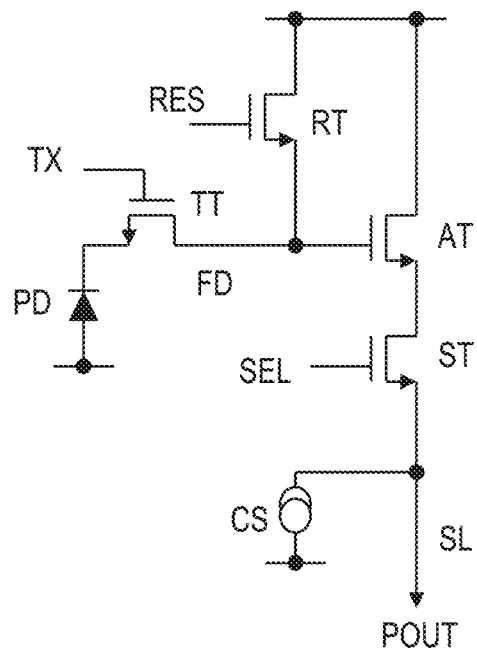
FIG. 2A is a circuit diagram showing an example of the arrangement of a pixel.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 shows the arrangement of a photoelectric converter 1 according to an embodiment. The photoelectric converter 1 can be formed as an image sensor. From another viewpoint, the photoelectric converter 1 can be configured to sense an image and output, to an external device, for example, a storage device, processing device, display device, or a communication device, the sensed image or information or an image obtained by processing the sensed image.

The photoelectric converter 1 can include a pixel array 10 including a plurality of pixels 11, and a current source group 20 including a plurality of current sources respectively connected to a plurality of vertical signal lines SL respectively provided in a plurality of columns of the pixel array 10. The photoelectric converter 1 can further include an amplifier group 30 for amplifying signals output from the pixel array 10 to the plurality of vertical signal lines SL, and a delta-sigma AD converter group 40 for converting, into digital signals, analog signals output from the amplifier group 30.

In addition, the photoelectric converter 1 can include a data processing unit (processor) 50 that processes the digital signals output from the delta-sigma AD converter group 40 and obtains information of processed information (for example, an image). The photoelectric converter 1 can include an output unit 60 that outputs at least one of the digital signals output from the delta-sigma AD converter group 40 and the information obtained by the processing of the data processing unit 50. The data processing unit 50 may be configured to supply, to the output unit 60, in a predetermined order, the digital signals generated by the delta-sigma AD converter group 40. The photoelectric converter 1 can include a row selection unit 70 that selects a row of the pixel array 10. The photoelectric converter 1 can include a control unit 80 that controls the amplifier group 30, the delta-sigma AD converter group 40, the data processing unit 50, the row selection unit 70, and the like.

The photoelectric converter 1 may include, in one semiconductor substrate (typically, a silicon semiconductor substrate), all the components shown in FIG. 1. As another example, the photoelectric converter 1 may have the arrangement of a stacked chip in which a plurality of semiconductor substrates are stacked. In this case, on the first semiconductor substrate as one of the plurality of semiconductor substrates, the pixel array 10 can be arranged. On another second semiconductor substrate, at least the amplifier group 30 and the delta-sigma AD converter group 40 are arranged. On the second semiconductor substrate, the current source group 20, the data processing unit 50, the output unit 60, the row selection unit 70, and the control unit 80 may also be arranged. Furthermore, if another third semiconductor substrate is provided, the data processing unit 50 and the output unit 60 may be arranged on the third semiconductor substrate.

Figure 2B:
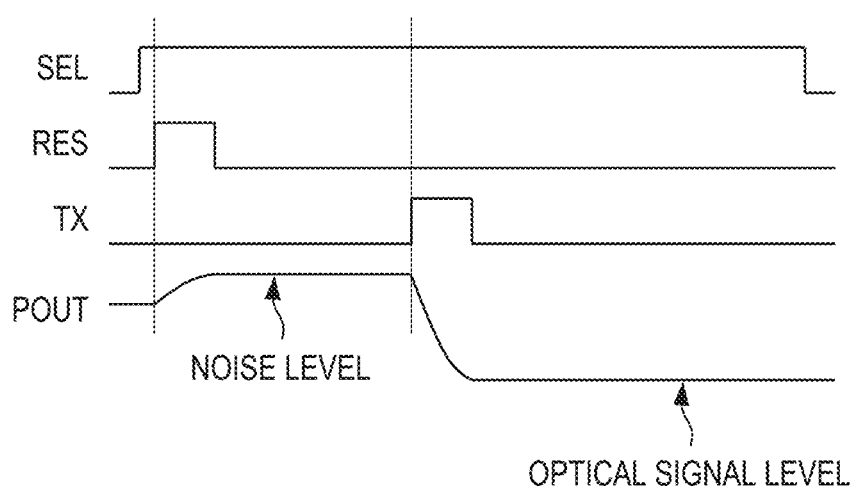
FIG. 2B is a timing chart showing an example of the operation of the pixel.

FIG. 2A shows an example of the arrangement of the pixel 11. FIG. 2B shows an example of the operation of the pixel 11. The pixel 11 can include a photoelectric conversion element PD, a floating diffusion FD, and a transfer transistor TT that transfers, to the floating diffusion FD, charges generated in the photoelectric conversion element PD and accumulated in the accumulation unit of the photoelectric conversion element PD. Furthermore, the pixel 11 can include a reset transistor RT that resets the voltage of the floating diffusion FD, and an amplification transistor AT that outputs a voltage corresponding to the voltage of the floating diffusion FD to the vertical signal line SL. The vertical signal line SL is connected to a corresponding current source CS of the current source group 20, and the amplification transistor AT can form a source follower circuit. A corresponding amplifier (an amplifier 31 to be described later) of the amplifier group 30 can amplify the voltage or signal output to the vertical signal line SL.

The pixel 11 may further include a selection transistor ST. The ON state of the selection transistor ST indicates selection of the pixel 11 including the selection transistor ST. When the selection transistor ST is turned on, an output from the amplification transistor AT is output to the vertical signal line SL. The transfer transistor TT, the reset transistor RT, and the selection transistor ST can be controlled by the row selection unit 70 via a transfer signal line TX, a reset signal line RES, and a selection signal line SEL, respectively.

FIG. 2B exemplifies the voltages of the selection signal line SEL, the reset signal line RES, the transfer signal line TX, and the vertical signal line SL as SEL, RES, TX, and POUT, respectively. In the example shown in FIGS. 2A and 2B, the active level of each of the selection signal SEL, the reset signal RES, and the transfer signal TX respectively supplied to the selection signal line SEL, the reset signal line RES, and the transfer signal line TX is high level. Note that reference symbols SEL, RES, and TX each denote both the signal line name and the signal name for the sake of convenience.

The voltage level appearing in the vertical signal line SL in a state in which the reset signal RES changes from high level to low level and reset by the reset transistor RT is canceled can be called a noise level. After that, when the transfer signal TX is set to high level, the transfer transistor TT transfers the charges of the photoelectric conversion element PD to the floating diffusion FD. This changes the voltage of the floating diffusion FD, and a voltage level corresponding to the voltage appears in the vertical signal line SL. This voltage level is called an optical signal level.

Figure 3A:
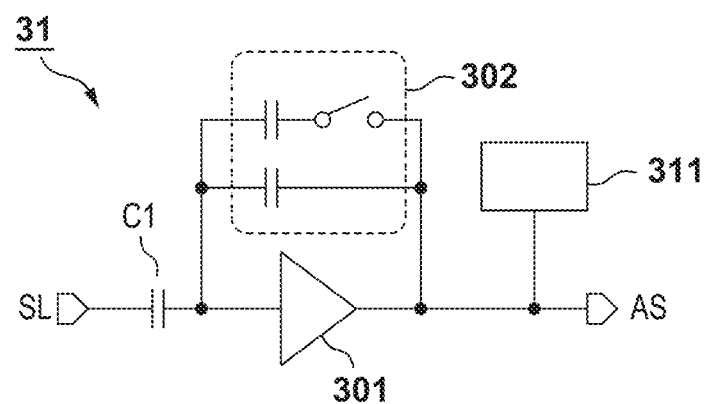
FIG. 3A is a circuit diagram showing the first arrangement example of an amplifier for one column.
Figure 3B:
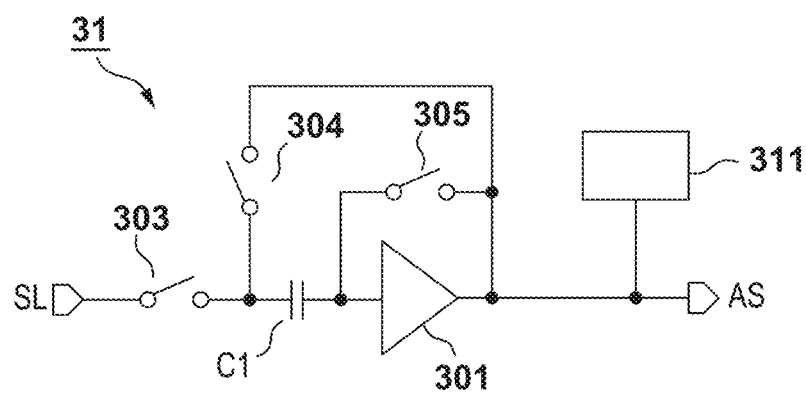
FIG. 3B is a circuit diagram showing the second arrangement example of the amplifier for one column.
Figure 3C:
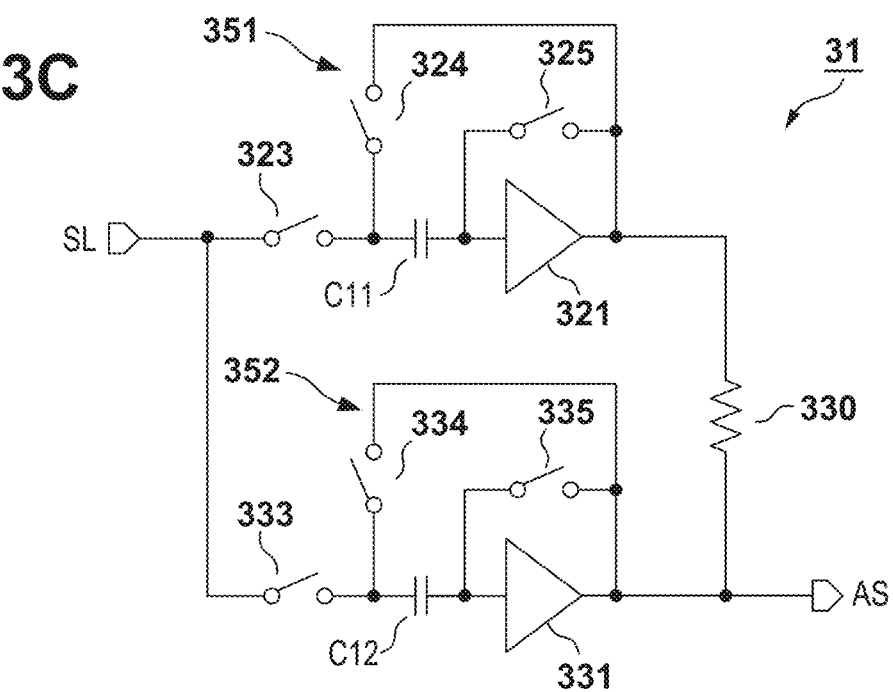
FIG. 3C is a circuit diagram showing the third arrangement example of the amplifier for one column.

FIGS. 3A to 3C respectively show the first, second, and third arrangement examples of the amplifier 31 for one column. The amplifier group 30 includes the plurality of amplifiers 31 respectively corresponding to the plurality of columns of the pixel array 10. The amplifier 31 of each of the first, second, and third arrangement examples is a capacitive coupling amplifier.

The amplifier 31 of the first arrangement example shown in FIG. 3A amplifies a pixel signal supplied from each pixel 11 to the vertical signal line SL, and outputs a voltage signal corresponding to the pixel signal from an output node AS. The amplifier 31 of the first arrangement example can be formed by a plurality of first elements. The plurality of first elements include at least one active element and at least one capacitive element. The amplifier 31 of the first arrangement example can include an amplifier circuit 301, a first capacitive element C1, and a feedback capacitance 302. The amplifier circuit 301 can include at least one active element (transistor). The amplifier circuit 301 can be, for example, an inverting amplifier circuit.

The first capacitive element C1 can be arranged between the input node (in this example, the vertical signal line SL) of the amplifier 31 and that of the amplifier circuit 301. More specifically, the first capacitive element C1 can be arranged in series between the input node of the amplifier 31 and that of the amplifier circuit 301. The feedback capacitance 302 can be arranged to connect the input terminal of the amplifier circuit 301 to the output terminal of the amplifier circuit 301. The feedback capacitance 302 can be formed as a variable capacitance. This provides a function of changing a gain for amplifying the pixel signal. The amplifier 31 may be provided with a clip circuit 311 that clips the output.

The amplifier 31 of the second arrangement example shown in FIG. 3B amplifies the pixel signal supplied from each pixel 11 to the vertical signal line SL, and outputs a voltage signal corresponding to the pixel signal from the output node AS. The amplifier 31 of the second arrangement example can be formed by a plurality of first elements. The plurality of first elements can include at least one active element and at least one capacitive element. The amplifier 31 of the second arrangement example can include the amplifier circuit 301, the first capacitive element C1, and switches (transistors) 303, 304, and 305. The amplifier circuit 301 can include at least one active element (transistor). The amplifier circuit 301 can be, for example, an inverting amplifier circuit. The first capacitive element C1 can be arranged between the input node (in this example, the vertical signal line SL) of the amplifier 31 and that of the amplifier circuit 301. More specifically, the first capacitive element C1 can be arranged in series between the input node of the amplifier 31 and that of the amplifier circuit 301.

The amplifier 31 of the third arrangement example shown in FIG. 3C amplifies a pixel signal supplied from each pixel 11 to the vertical signal line SL, and outputs a current signal corresponding to the pixel signal. From another viewpoint, the amplifier 31 of the third arrangement example outputs a current signal obtained by amplifying the difference between the optical signal level and the noise level supplied from each pixel 11.

The amplifier 31 of the third arrangement example can include a first amplifier 351 that amplifies the optical signal level, a second amplifier 352 that amplifies the noise level, and a resistive element 330 that connects the output terminal of the first amplifier 351 to the output terminal of the second amplifier 352. The first amplifier 351 outputs the first voltage obtained by amplifying the optical signal level, and the second amplifier 352 outputs the second voltage obtained by amplifying the noise level. This causes a current having a value obtained by dividing the difference between the first voltage and the second voltage by the resistance value of the resistive element 330 to flow through the resistive element 330, and a current corresponding to the current is output from the output node AS.

Each of the first amplifier 351 and the second amplifier 352 can have the same arrangement as that of the amplifier 31 of the second arrangement example. The first amplifier 351 can be formed by a plurality of first elements. The plurality of first elements can include at least one active element and at least one capacitive element. The first amplifier 351 can include an amplifier circuit 321, a first capacitive element C11, and switches (transistors) 323, 324, and 325. The amplifier circuit 321 can include at least one active element (transistor). The amplifier circuit 321 can be, for example, an inverting amplifier circuit. The first capacitive element C11 can be arranged between the input node (in this example, the vertical signal line SL) of the amplifier 31 and that of the amplifier circuit 321. More specifically, the first capacitive element C11 can be arranged in series between the input node of the amplifier 31 and that of the amplifier circuit 321.

The second amplifier 352 can be formed by a plurality of first elements. The plurality of first elements can include at least one active element and at least one capacitive element. The second amplifier 352 can include an amplifier circuit 331, a first capacitive element C12, and switches (transistors) 333, 334, and 335. The amplifier circuit 331 can include at least one active element (transistor). The amplifier circuit 331 can be, for example, an inverting amplifier circuit. The first capacitive element C12 can be arranged between the input node (in this example, the vertical signal line SL) of the amplifier 31 and that of the amplifier circuit 331. More specifically, the first capacitive element C12 can be arranged in series between the input node of the amplifier 31 and that of the amplifier circuit 331.

Figure 4:
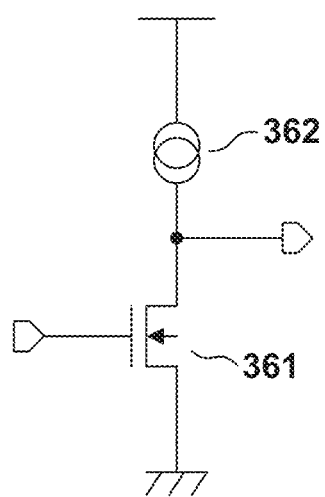
FIG. 4 is a circuit diagram showing an example of the arrangement of an amplifier circuit in the amplifier shown in each of FIGS. 3A to 3C.

FIG. 4 shows an example of the arrangement of each of the amplifier circuits 301, 321, and 331. Each of the amplifier circuits 301, 321, and 331 can be formed by, for example, a transistor 361 and a current source 362 which are connected in series. Alternatively, although not shown, each of the amplifier circuits 301, 321, and 331 may be formed by a differential amplifier circuit.

Figure 5:
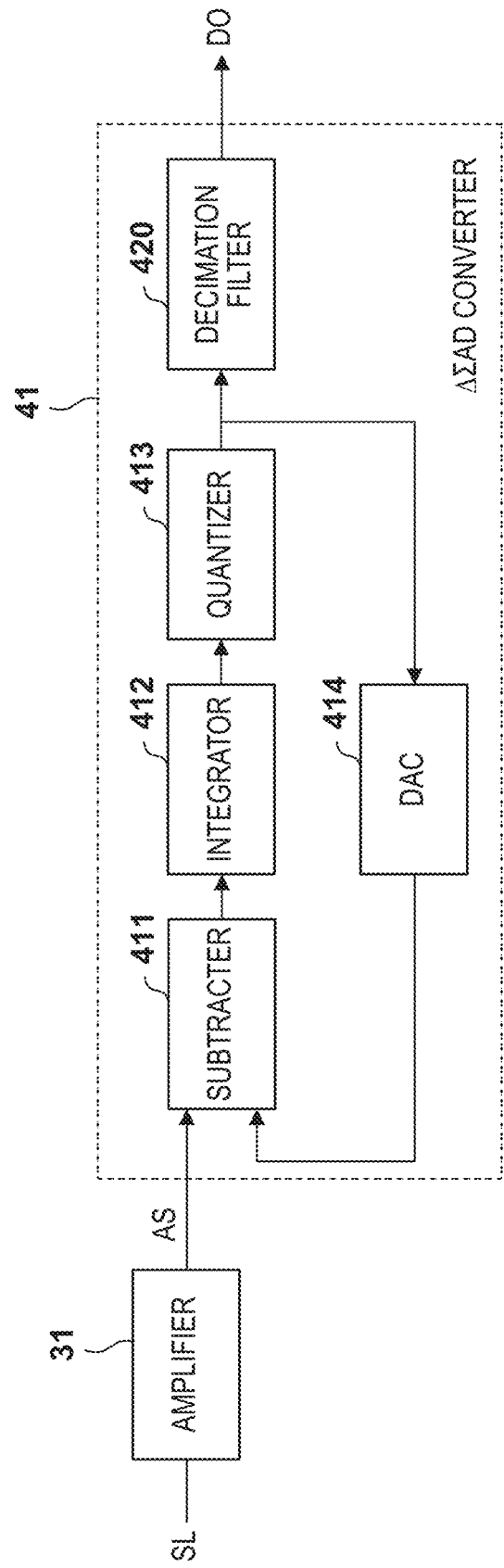
FIG. 5 is a block diagram showing the first arrangement example of a delta-sigma AD converter for one column.

FIG. 5 shows the first arrangement example of a delta-sigma AD converter 41 for one column. The plurality of pixels 11 forming one column of the pixel array 10 is represented by one pixel 11. The delta-sigma AD converter group 40 includes the plurality of delta-sigma AD converters 41 respectively corresponding to the plurality of columns of the pixel array 10. The delta-sigma AD converter 41 exemplified in FIG. 5 has the arrangement of a first-order delta-sigma AD converter.

The delta-sigma AD converter 41 can include, for example, a subtracter 411, an integrator 412, a quantizer 413, a DA converter 414, and a decimation filter 420. The subtracter 411, the integrator 412, the quantizer 413, and the DA converter 414 can form a delta-sigma modulator. The subtracter 411 calculates the difference between a signal supplied from the amplifier 31 and a signal supplied from the DA converter 414, and supplies the difference to the integrator 412. The integrator 412 integrates the signal supplied from the subtracter 411, and supplies the integration result to the quantizer 413.

The quantizer 413 quantizes the integration result supplied from the integrator 412. More specifically, the quantizer 413 can quantize the integration result, that is, perform conversion into a 1-bit digital signal by comparing the integration result supplied from the integrator 412 with a predetermined reference voltage. The decimation filter 420 is a kind of digital low-pass filter, and converts the 1-bit digital signal output from the quantizer 413 into a digital signal of a plurality of bits by decimation processing. The delta-sigma AD converter 41 is formed by a plurality of second elements, and the plurality of second elements can include a plurality of active elements and a plurality of capacitive elements.

In one embodiment, the second breakdown voltage as the breakdown voltage of at least one of the plurality of second elements forming the delta-sigma AD converter 41 is lower than the first breakdown voltage as the breakdown voltage of the plurality of first elements forming the amplifier 31. This arrangement contributes to the high-speed operation of the second element having the second breakdown voltage, and is advantageous in speeding up the operation of the delta-sigma AD converter 41. In other words, the arrangement is advantageous in speeding up readout of the signal from each pixel 11 of the pixel array 10. Alternatively, this arrangement contributes to a decrease in occupied area of the delta-sigma AD converter 41, or is advantageous in decreasing the occupied area of the circuit for reading out a signal from each pixel 11 of the pixel array 10.

The photoelectric converter 1 can be configured so that the maximum voltage applied to at least one second element having the second breakdown voltage is lower than the maximum voltage applied to the plurality of first elements. This arrangement decreases a voltage amplitude in the second element having the second breakdown voltage, and is thus advantageous in speeding up readout of a signal from each pixel 11 of the pixel array 10.

The delta-sigma AD converter 41 can be formed by a plurality of blocks, for example, the subtracter 411, the integrator 412, the quantizer 413, the DA converter 414, and the decimation filter 420. The breakdown voltage of the second element forming at least one of the plurality of blocks can be made lower than the breakdown voltage of the plurality of first elements forming the amplifier 31.

From the first viewpoint, the breakdown voltage of at least the second element, which forms the decimation filter 420, among the plurality of second elements forming the delta-sigma AD converter 41 can be made lower than the breakdown voltage of the plurality of first elements forming the amplifier 31. The decimation filter 420 is a block that should operate at highest speed among the plurality of blocks forming the delta-sigma AD converter 41. The fact that the breakdown voltage of the second element forming the decimation filter 420 is lower than that of the plurality of first elements forming the amplifier 31 contributes to the high-speed operation of the decimation filter 420. The decrease of the breakdown voltage of the second element can, for example, decrease the film thickness of a gate oxide film and/or shorten a gate length, thereby facilitating the high-speed operation.

From the second viewpoint, the breakdown voltage of at least the second element, which forms the quantizer 413, among the plurality of second elements forming the delta-sigma AD converter 41 can be made lower than the breakdown voltage of the plurality of first elements forming the amplifier 31. Similar to the decimation filter 420, the quantizer 413 is a block that should operate at high speed. The fact that the breakdown voltage of the second element forming the quantizer 413 is lower than that of the plurality of first elements forming the amplifier 31 contributes to the high-speed operation of the quantizer 413. Furthermore, the breakdown voltages of at least the second elements, which form the decimation filter 420 and the quantizer 413, among the plurality of second elements forming the delta-sigma AD converter 41 can be made lower than the breakdown voltage of the plurality of first elements forming the amplifier 31. In this example, the breakdown voltage of the second elements forming the quantizer 413 and the decimation filter 420 may be lower than that of the second elements forming the subtracter 411, the integrator 412, and the DA converter 414.

From the third viewpoint, the breakdown voltage of at least the second element, which forms the integrator 412, among the plurality of second elements forming the delta-sigma AD converter 41 can be made lower than the breakdown voltage of the plurality of first elements forming the amplifier 31. Furthermore, the breakdown voltages of at least the second elements, which form the decimation filter 420, the quantizer 413, and the integrator 412, among the plurality of second elements forming the delta-sigma AD converter 41 can be made lower than the breakdown voltage of the plurality of first elements forming the amplifier 31. In this example, the breakdown voltages of the second elements forming the integrator 412, the quantizer 413, and the decimation filter 420 may be lower than that of the second elements forming the subtracter 411 and the DA converter 414.

From the fourth viewpoint, the breakdown voltage of at least the second element, which forms the DA converter 414, among the plurality of second elements forming the delta-sigma AD converter 41 can be made lower than the breakdown voltage of the plurality of first elements forming the amplifier 31. Furthermore, the breakdown voltages of at least the second elements, which form the decimation filter 420, the quantizer 413, the integrator 412, and the DA converter 414, among the plurality of second elements forming the delta-sigma AD converter 41 can be made lower than the breakdown voltage of the plurality of first elements forming the amplifier 31. In this example, the breakdown voltages of the second elements forming the DA converter 414, the integrator 412, the quantizer 413, and the decimation filter 420 may be lower than that of the second element forming the subtracter 411.

The output signal of the amplifier 31 is input to the subtracter 411. Therefore, the subtracter 411 can be required to have the breakdown voltage corresponding to the maximum value of the output signal of the amplifier 31. For example, the amplifier 31 can be driven by the first power supply voltage (for example, 3.3 V), and the subtracter 411 can also be driven by the first power supply voltage. On the other hand, the integrator 412, the quantizer 413, the DA converter 414, and the decimation filter 420 can be driven by the second power supply voltage (for example, 1.2 V) lower than the first power supply voltage.

Figure 6:
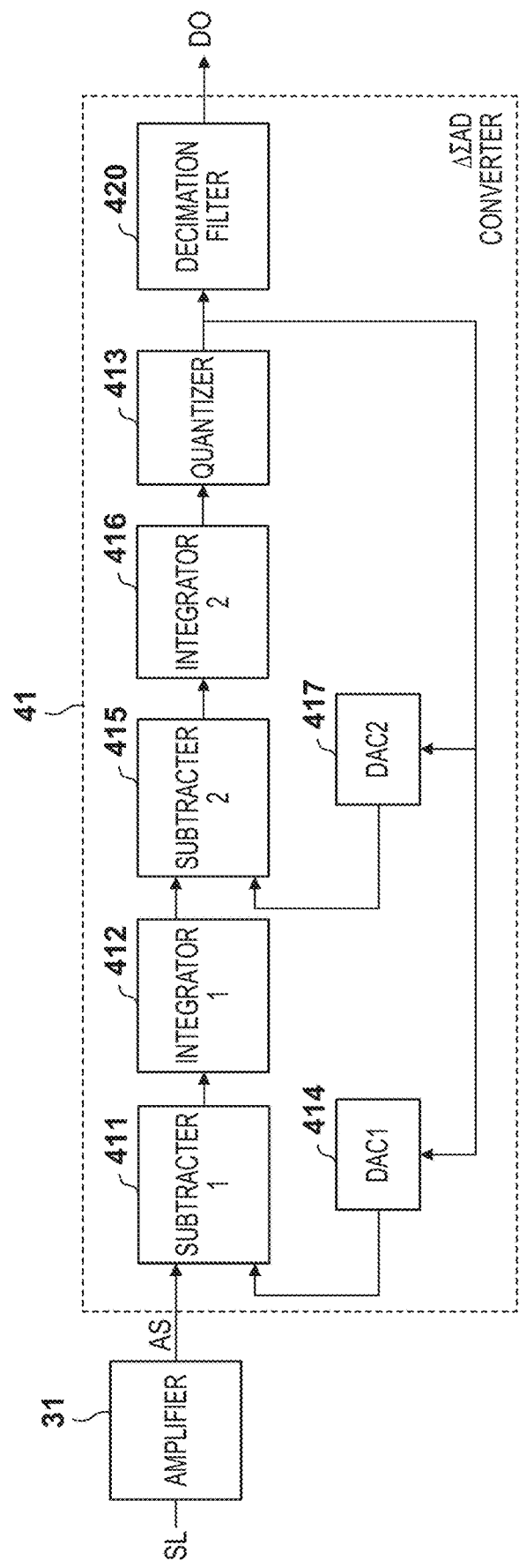
FIG. 6 is a block diagram showing the second arrangement example of the delta-sigma AD converter for one column.

FIG. 6 shows the second arrangement example of the delta-sigma AD converter 41 for one column. The plurality of pixels 11 forming one column of the pixel array 10 are represented by one pixel 11. The delta-sigma AD converter 41 exemplified in FIG. 6 has the arrangement of a second-order delta-sigma AD converter. The delta-sigma AD converter 41 can include a first subtracter 411, a first integrator 412, a second subtracter 415, a second integrator 416, a quantizer 413, a first DA converter 414, a second DA converter 417, and a decimation filter 420. The first subtracter 411 outputs the difference between a signal supplied to the delta-sigma AD converter 41 and an output from the first DA converter 414. The first integrator 412 integrates the output from the first subtracter 411. The second subtracter 415 outputs the difference between the output from the first integrator 412 and an output from the second DA converter 417. The second integrator 416 integrates the output from the second subtracter 415. The quantizer 413 quantizes the output from the second integrator 416. Each of the first DA converter 414 and the second DA converter 417 DA-converts an output from the quantizer 413. The delta-sigma AD converter 41 is formed by a plurality of second elements, and the plurality of second elements can include a plurality of active elements and a plurality of capacitive elements.

The delta-sigma AD converter 41 can be formed by a plurality of blocks. The first block can be formed by the decimation filter 420. The second block can be formed by the quantizer 413. The third block can be formed by the first integrator 412 and the second integrator 416. The fourth block can be formed by the first DA converter 414 and the second DA converter 417. The fifth block can be formed by the first subtracter 411 and the second subtracter 415. The breakdown voltage of the second element forming at least one of the plurality of blocks can be made lower than the breakdown voltage of the plurality of first elements forming the amplifier 31.

From the first viewpoint, the breakdown voltage of at least the second element forming the first block among the plurality of second elements forming the delta-sigma AD converter 41 can be made lower than the breakdown voltage of the plurality of first elements forming the amplifier 31. The decimation filter 420 forming the first block is a block that should operate at highest speed among the plurality of blocks forming the delta-sigma AD converter 41. The fact that the breakdown voltage of the second element forming the first block is lower than that of the plurality of first elements forming the amplifier 31 contributes to the high-speed operation of the first block.

From the second viewpoint, the breakdown voltage of at least the second element forming the second block among the plurality of second elements forming the delta-sigma AD converter 41 can be made lower than the breakdown voltage of the plurality of first elements forming the amplifier 31. Similar to the decimation filter 420, the quantizer 413 forming the second block is a block that should operate at high speed. The fact that the breakdown voltage of the second element forming the second block is lower than that of the plurality of first elements forming the amplifier 31 contributes to the high-speed operation of the quantizer 413.

Furthermore, the breakdown voltage of at least the second elements forming the first and second blocks among the plurality of second elements forming the delta-sigma AD converter 41 can be made lower than the breakdown voltage of the plurality of first elements forming the amplifier 31. In this example, the breakdown voltage of the second elements forming the first and second blocks may be lower than that of the second elements forming the third, fourth, and fifth blocks.

From the third viewpoint, the breakdown voltage of at least the second element forming the third block among the plurality of second elements forming the delta-sigma AD converter 41 can be made lower than the breakdown voltage of the plurality of first elements forming the amplifier 31. Furthermore, the breakdown voltage of at least the second elements forming the first, second, and third blocks among the plurality of second elements forming the delta-sigma AD converter 41 can be made lower than the breakdown voltage of the plurality of first elements forming the amplifier 31. In this example, the breakdown voltage of the second elements forming the first, second, and third blocks may be lower than that of the second elements forming the fourth and fifth blocks.

From the fourth viewpoint, the breakdown voltage of at least the second element forming the fourth block among the plurality of second elements forming the delta-sigma AD converter 41 can be made lower than the breakdown voltage of the plurality of first elements forming the amplifier 31. Furthermore, the breakdown voltage of at least the second elements forming the first, second, third, and fourth blocks among the plurality of second elements forming the delta-sigma AD converter 41 can be made lower than the breakdown voltage of the plurality of first elements forming the amplifier 31. In this example, the breakdown voltage of the second elements forming the first, second, third, and fourth blocks may be lower than that of the second element forming the subtracter 411. The output signal of the amplifier 31 is input to the subtracter 411 forming the fifth block. Therefore, the subtracter 411 forming the fifth block can be required to have the breakdown voltage corresponding to the maximum value of the output signal of the amplifier 31. For example, the amplifier 31 can be driven by the first power supply voltage (for example, 3.3 V), and the first subtracter 411 forming part of the first block can also be driven by the first power supply voltage. On the other hand, the first, second, third, and fourth blocks can be driven by the second power supply voltage (for example, 1.2 V) lower than the first power supply voltage.

Figure 7:
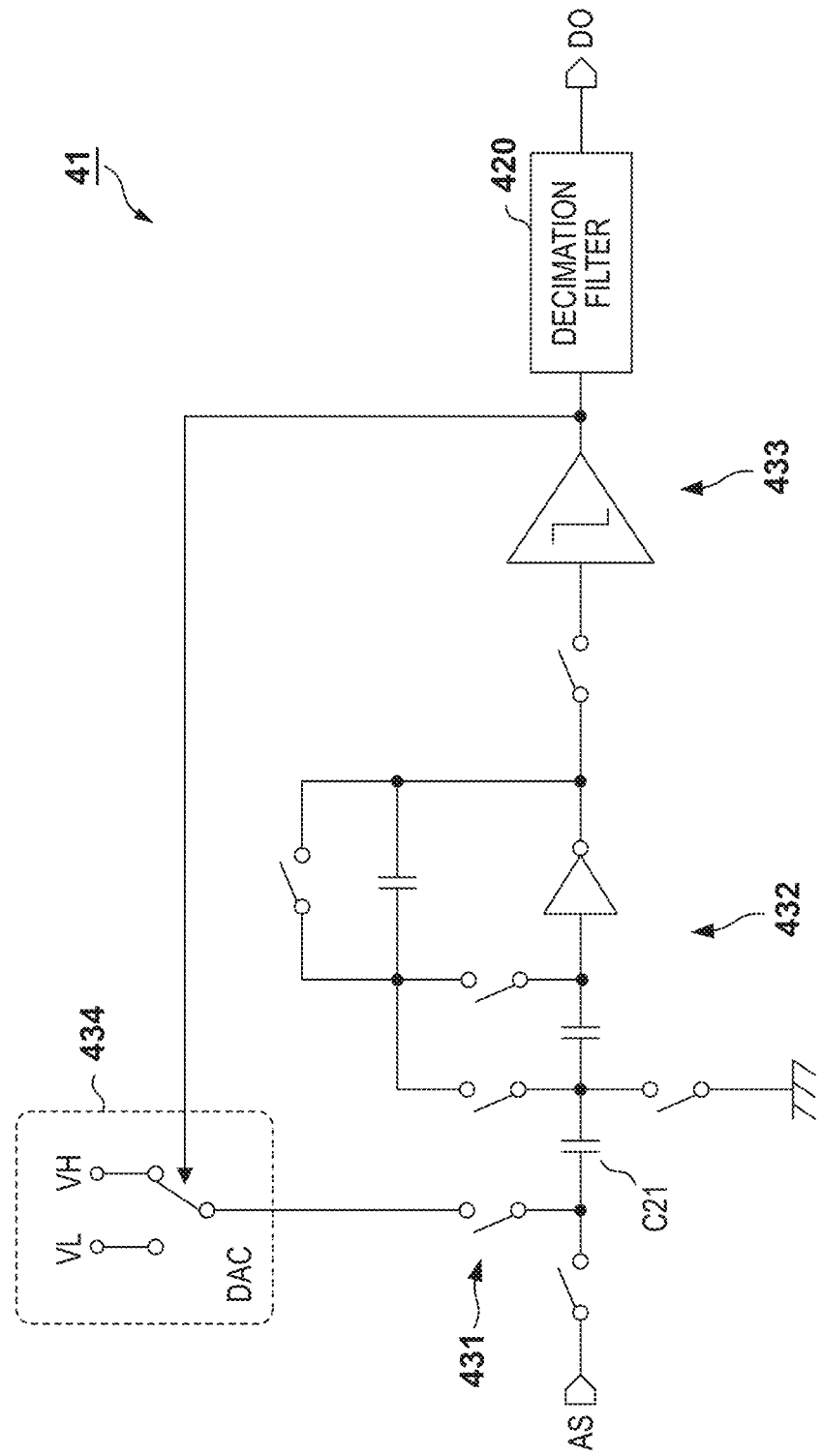
FIG. 7 is a circuit diagram showing the first practical example of the delta-sigma AD converter for one column.

FIG. 7 shows the first practical example of the delta-sigma AD converter 41 for one column. The delta-sigma AD converter 41 according to the first practical example is a first-order voltage integrating delta-sigma AD converter. The delta-sigma AD converter 41 according to the first practical example is suitable for a combination with, for example, the amplifier 31 of the first or second arrangement example shown in FIG. 3A or 3B. The delta-sigma AD converter 41 according to the first practical example can include a subtracter 431, an integrator 432, a quantizer 433, a DA converter 434, and the decimation filter 420.

From one viewpoint, a plurality of second elements forming the delta-sigma AD converter 41 according to the first practical example can include a second capacitive element C21 that is charged with a current supplied to the input node (in this example, the output node AS of the amplifier 31) of the delta-sigma AD converter 41. In one example, the capacitance value of the second capacitive element C21 is smaller than that of the above-described first capacitive element C1. In this example, the breakdown voltage of the second capacitive element C21 is lower than that of the above-described first capacitive element C1.

Figure 8:
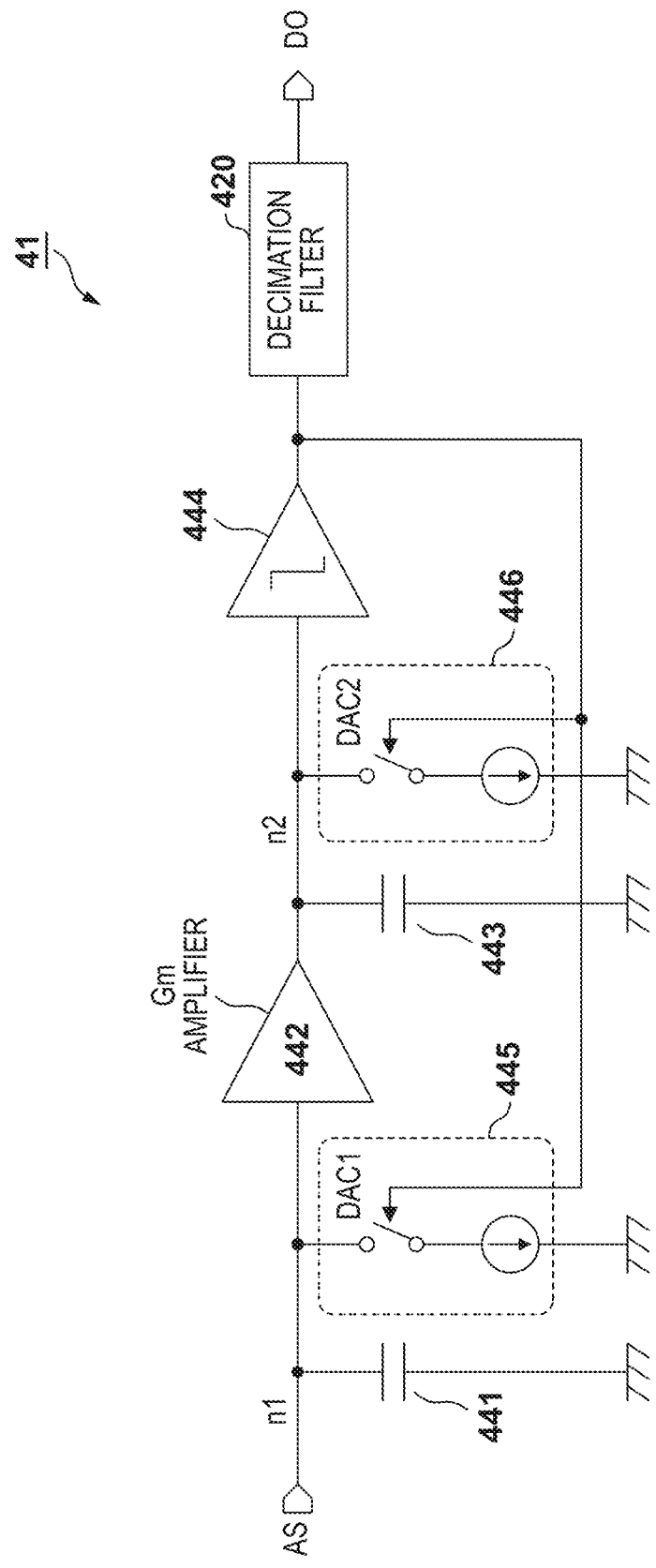
FIG. 8 is a circuit diagram showing the second practical example of the delta-sigma AD converter for one column.

FIG. 8 shows the second practical example of the delta-sigma AD converter 41 for one column. The delta-sigma AD converter 41 according to the second practical example is a second-order current integrating delta-sigma AD converter. The delta-sigma AD converter 41 according to the second practical example is suitable for a combination with, for example, the amplifier 31 of the third arrangement example shown in FIG. 3C.

The delta-sigma AD converter 41 according to the second practical example can include a first integrator 441, a voltage-current converter 442, a second integrator 443, a quantizer 444, a first DA converter 445, a second DA converter 446, and the decimation filter 420. The first integrator 441 integrates a current supplied to an input node n1 (in this example, the output node AS of the amplifier 31) of the delta-sigma AD converter 41. The voltage-current converter 442 converts the voltage of the input node n1 into a current. The second integrator 443 integrates a current supplied to an intermediate node n2 connected to the output of the voltage-current converter 442. The quantizer 444 quantizes the voltage of the intermediate node n2. The first DA converter 445 extracts a predetermined current from the input node n1 in accordance with the output from the quantizer 444. The second DA converter 446 extracts a predetermined current from the intermediate node n2 in accordance with the output from the quantizer 444. The decimation filter 420 converts a 1-bit digital signal output from the quantizer 444 into a digital signal of a plurality of bits by decimation processing.

From the first viewpoint, the breakdown voltage of at least the second element forming the decimation filter 420 among the plurality of second elements forming the delta-sigma AD converter 41 can be made lower than the breakdown voltage of the plurality of first elements forming the amplifier 31. The decimation filter 420 is a block that should operate at highest speed among the plurality of blocks forming the delta-sigma AD converter 41. The fact that the breakdown voltage of the second element forming the decimation filter 420 is lower than that of the plurality of first elements forming the amplifier 31 contributes to the high-speed operation of the decimation filter 420.

From the second viewpoint, the breakdown voltage of at least the second element forming the quantizer 444 among the plurality of second elements forming the delta-sigma AD converter 41 can be made lower than the breakdown voltage of the plurality of first elements forming the amplifier 31. Similar to the decimation filter 420, the quantizer 444 is a block that should operate at high speed. The fact that the breakdown voltage of the second element forming the quantizer 444 is lower than that of the plurality of first elements forming the amplifier 31 contributes to the high-speed operation of the quantizer 444. Furthermore, the breakdown voltage of at least the second elements forming the decimation filter 420 and the quantizer 444 among the plurality of second elements forming the delta-sigma AD converter 41 can be made lower than the breakdown voltage of the plurality of first elements forming the amplifier 31. In this example, the breakdown voltage of the second elements forming the quantizer 444 and the decimation filter 420 may be lower than that of the second elements forming the first integrator 441, the voltage-current converter 442, the second integrator 443, the first DA converter 445, and the second DA converter 446.

From the third viewpoint, the breakdown voltage of at least the second elements forming the first integrator 441 and the second integrator 443 among the plurality of second elements forming the delta-sigma AD converter 41 can be made lower than the breakdown voltage of the plurality of first elements forming the amplifier 31. Furthermore, the breakdown voltage of at least the second elements forming the decimation filter 420, the quantizer 444, the first integrator 441, and the second integrator 443 among the plurality of second elements forming the delta-sigma AD converter 41 can be made lower than the breakdown voltage of the plurality of first elements forming the amplifier 31. In this example, the breakdown voltage of the second elements forming the first integrator 441, the voltage-current converter 442, the second integrator 443, the quantizer 444, and the decimation filter 420 may be lower than that of the second elements forming the first DA converter 445 and the second DA converter 446.

From the fourth viewpoint, the breakdown voltage of at least the second elements forming the first DA converter 445 and the second DA converter 446 among the plurality of second elements forming the delta-sigma AD converter 41 can be made lower than the breakdown voltage of the plurality of first elements forming the amplifier 31. Furthermore, the breakdown voltage of at least the second elements forming the decimation filter 420, the quantizer 444, the integrator 412, and the DA converter 414 among the plurality of second elements forming the delta-sigma AD converter 41 can be made lower than the breakdown voltage of the plurality of first elements forming the amplifier 31.

Figure 9:
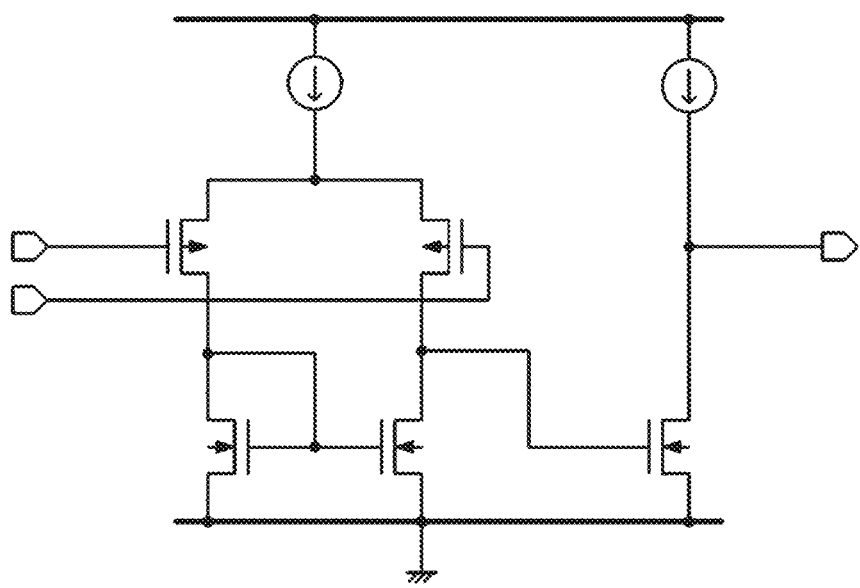
FIG. 9 is a circuit diagram showing an example of the arrangement of a quantizer.

FIG. 9 shows an example of the arrangement of the quantizer 413 or 444. As exemplified in FIG. 9, the quantizer 413 or 444 can be formed by a comparator or a differential amplifier. The plurality of second elements forming the quantizer 413 or 444 can have the same breakdown voltage.

Figure 10:
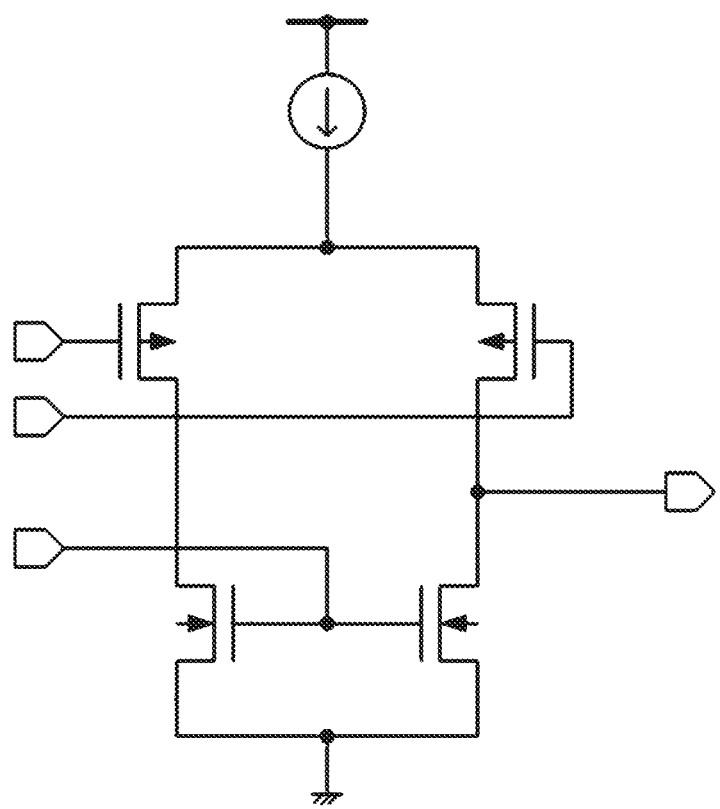
FIG. 10 is a circuit diagram showing an example of the arrangement of a voltage-current converter.

FIG. 10 shows an example of the arrangement of the voltage-current converter 442. As exemplified in FIG. 10, the voltage-current converter 442 can be formed by a differential amplifier. The plurality of second elements forming the voltage-current converter 442 can have the same breakdown voltage.

Figure 11:
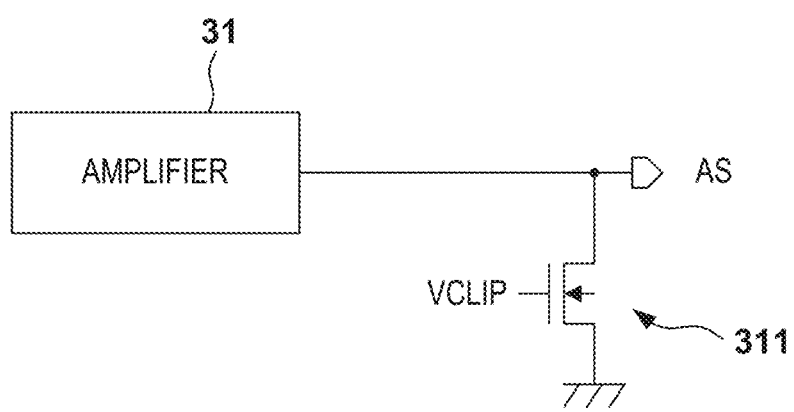
FIG. 11 is a circuit diagram showing an example of the arrangement of a clip circuit.

FIG. 11 shows an example of the arrangement of the clip circuit 311. The clip circuit 311 can include a transistor arranged between the output node AS of the amplifier 31 and a predetermined voltage. A voltage VCLIP for limiting the voltage of the output node AS can be supplied to the gate of the transistor.

Figure 12A:
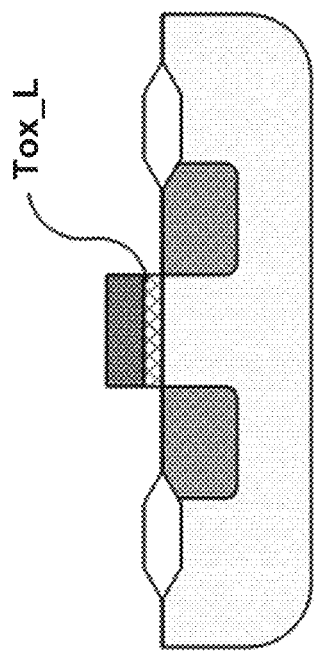
FIG. 12A is a view showing an example of the arrangement of a transistor of the amplifier.
Figure 12B:
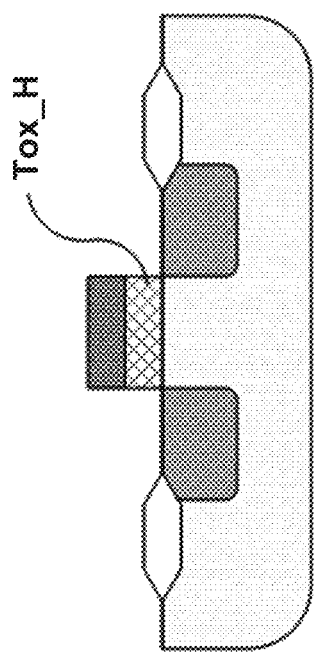
FIG. 12B is a view showing an example of the arrangement of a transistor of the delta-sigma AD converter.

FIG. 12A schematically shows the structure of the transistor among the plurality of first elements forming the amplifier 31. FIG. 12B schematically shows the structure of at least one transistor among the plurality of second elements forming the delta-sigma AD converter 41. As schematically shown in FIGS. 12A and 12B, at least one transistor forming the delta-sigma AD converter 41 can include a gate oxide film thinner than that of the transistor forming the amplifier 31. At least one transistor forming the delta-sigma AD converter 41 can have a gate length shorter than that of the transistor forming the amplifier 31.

Figure 13A:
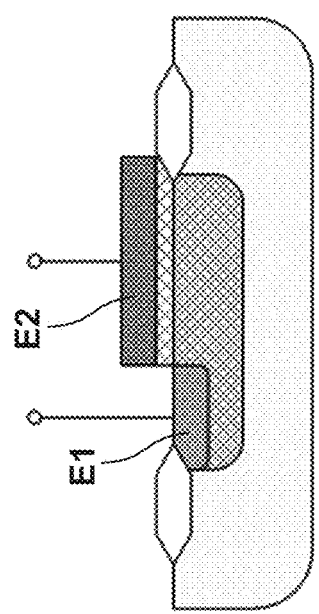
FIG. 13A is a view showing an example of the arrangement of a capacitive element of the amplifier.
Figure 13B:
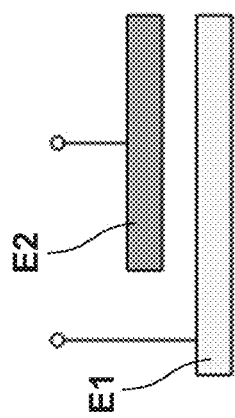
FIG. 13B is a view showing an example of the arrangement of the capacitive element of the amplifier.
Figure 13C:
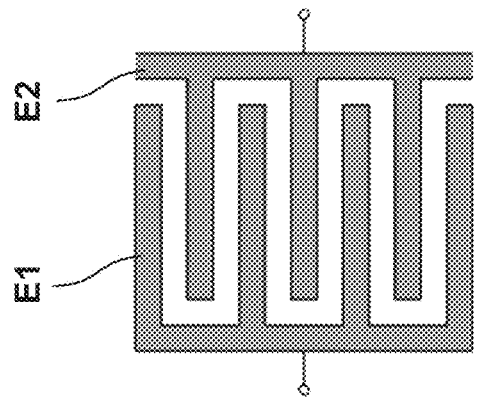
FIG. 13C is a view showing an example of the arrangement of the capacitive element of the amplifier.

FIG. 13A exemplifies the structure of at least one first element (capacitive element) among the plurality of first elements forming the amplifier 31. As schematically shown in FIG. 13A, the first element can include a diffusion capacitance between two electrodes E1 and E2. FIG. 13B exemplifies the structure of at least one second element (capacitive element) forming the delta-sigma AD converter 41. As schematically shown in FIG. 13B, the second element can be an MIM (Metal-Insulator-Metal) capacitance in which two electrodes E1 and E2 are stacked via an interlayer insulating film. FIG. 13C exemplifies the structure of at least one second element (capacitive element) forming the delta-sigma AD converter 41. As schematically shown in FIG. 13C, the second element can be an MIM capacitance in which two electrodes E1 and E2 are arranged in the same layer. At least one second element (capacitive element) forming the delta-sigma AD converter 41 can include at least one of an MIM capacitance and an MOM capacitance. The MOM capacitance and the MIM capacitance exemplify capacitive elements each formed by opposite patterns. The patterns can include metallic patterns or metallized patterns.

In one arrangement example, the total sum of the capacitance values of the capacitive elements among the plurality of second elements of the delta-sigma AD converter 41 is smaller than the total sum of the capacitance values of the capacitive elements among the plurality of first elements of the amplifier 31. In another arrangement example, the minimum value of the capacitance values of all the capacitive elements of the delta-sigma AD converter 41 is smaller than the minimum value of the capacitance values of all the capacitive elements of the amplifier 31.

FIG. 14 is a block diagram showing the arrangement of a photoelectric conversion system 1200 according to this embodiment. The photoelectric conversion system 1200 according to this embodiment includes a photoelectric converter 1215. The photoelectric converter 1215 is the photoelectric converter 1 described in the above embodiment. The photoelectric conversion system 1200 can be used as, for example, an image sensing system. Practical examples of the image sensing system are a digital still camera, a digital camcorder, and a monitoring camera. FIG. 14 shows an example of a digital still camera as the photoelectric conversion system 1200.

The photoelectric conversion system 1200 shown in FIG. 14 includes the photoelectric converter 1215, a lens 1213 for forming an optical image of an object on the photoelectric converter 1215, an aperture 1214 for changing the amount of light passing through the lens 1213, and a barrier 1212 for protecting the lens 1213. The lens 1213 and the aperture 1214 form an optical system for concentrating light to the photoelectric converter 1215.

The photoelectric conversion system 1200 includes a signal processing unit 1216 for processing an output signal output from the photoelectric converter 1215. The signal processing unit 1216 performs an operation of signal processing of performing various kinds of correction and compression for an input signal, as needed, thereby outputting the resultant signal. The photoelectric conversion system 1200 further includes a buffer memory unit 1206 for temporarily storing image data and an external interface unit (external I/F unit) 1209 for communicating with an external computer or the like. Furthermore, the photoelectric conversion system 1200 includes a recording medium 1211 such as a semiconductor memory for recording or reading out image sensing data, and a recording medium control interface unit (recording medium control I/F unit) 1210 for performing a recording or readout operation in or from the recording medium 1211. The recording medium 1211 may be incorporated in the photoelectric conversion system 1200 or may be detachable. In addition, communication with the recording medium 1211 from the recording medium control I/F unit 1210 or communication from the external I/F unit 1209 may be performed wirelessly.

Furthermore, the photoelectric conversion system 1200 includes a general control/arithmetic unit 1208 that controls various kinds of operations and the entire digital still camera, and a timing generation unit 1217 that outputs various kinds of timing signals to the photoelectric converter 1215 and the signal processing unit 1216. In this example, the timing signal and the like may be input from the outside, and the photoelectric conversion system 1200 need only include at least the photoelectric converter 1215 and the signal processing unit 1216 that processes an output signal output from the photoelectric converter 1215. As described in the fourth embodiment, the timing generation unit 1217 may be incorporated in the photoelectric converter. The general control/arithmetic unit 1208 and the timing generation unit 1217 may be configured to perform some or all of the control functions of the photoelectric converter 1215.

The photoelectric converter 1215 outputs an image signal to the signal processing unit 1216. The signal processing unit 1216 performs predetermined signal processing for the image signal output from the photoelectric converter 1215 and outputs image data. The signal processing unit 1216 also generates an image using the image signal. Furthermore, the signal processing unit 1216 may perform distance measurement calculation for the signal output from the photoelectric converter 1215. Note that the signal processing unit 1216 and the timing generation unit 1217 may be incorporated in the photoelectric converter. That is, each of the signal processing unit 1216 and the timing generation unit 1217 may be provided on a substrate on which pixels are arranged or may be provided on another substrate. An image sensing system capable of acquiring a higher-quality image can be implemented by forming an image sensing system using the photoelectric converter of each of the above-described embodiments.

Figure 15A:
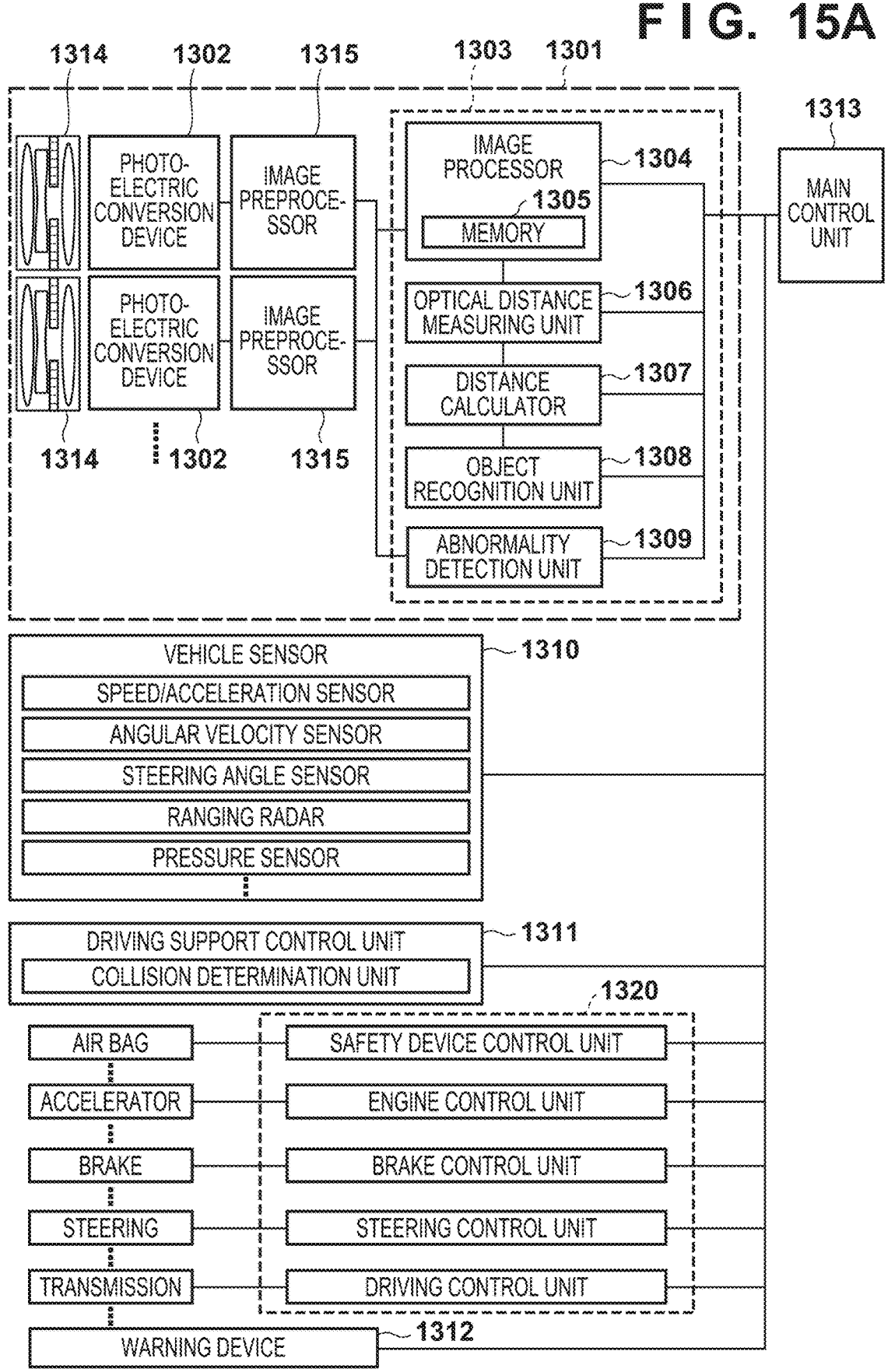
FIG. 15A is a block diagram showing the arrangement of a photoelectric conversion system and a moving body according to the embodiment.
Figure 15B:
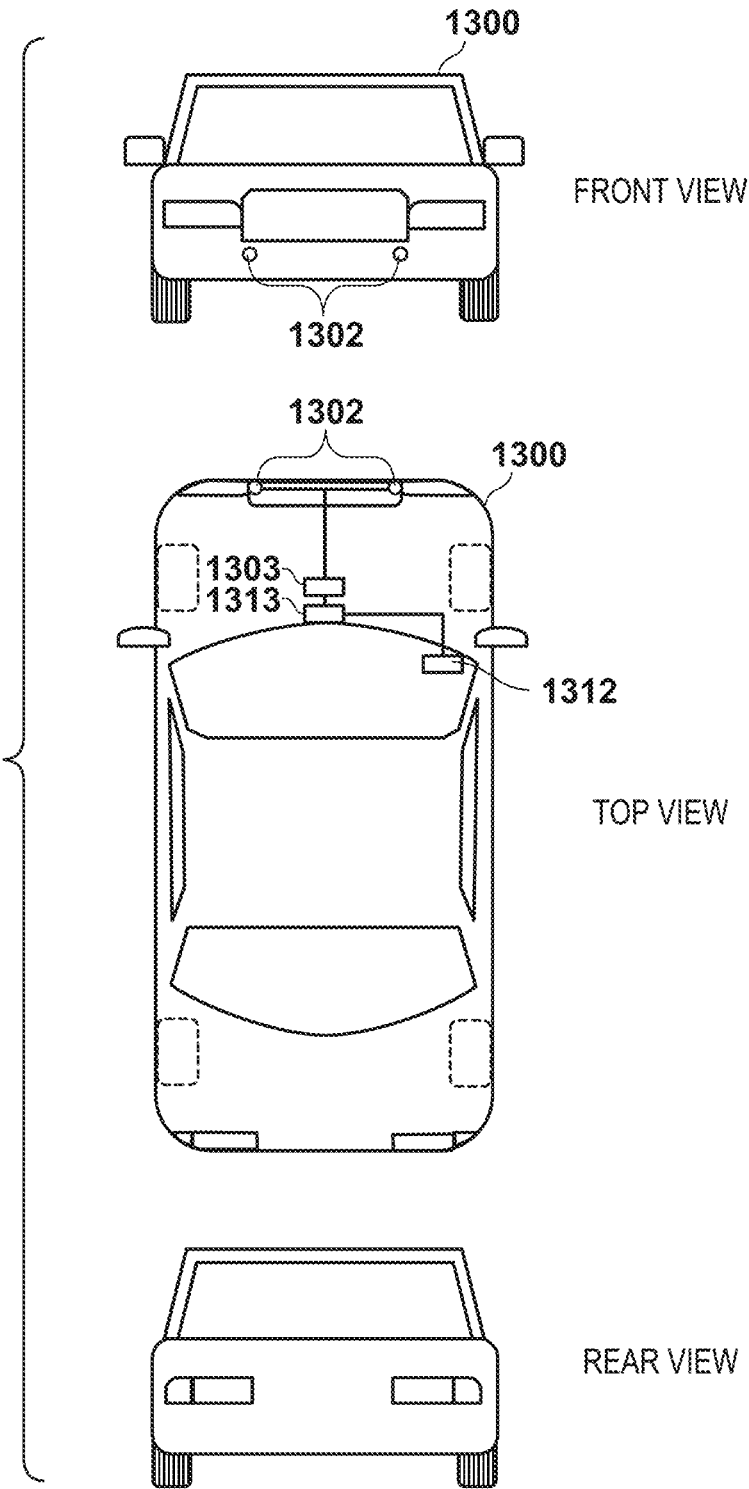
FIG. 15B is a view showing the arrangement of the moving body according to the embodiment.

The photoelectric conversion system and a moving body according to this embodiment will be described with reference to FIGS. 15A and 15B. FIGS. 15A and 15B show examples of a vehicle system and a photoelectric conversion system that is incorporated in the vehicle system and performs image sensing. A photoelectric conversion system 1301 includes a photoelectric converter 1302, an image preprocessing unit 1315, an integrated circuit 1303, and an optical system 1314. The optical system 1314 forms an optical image of an object on the photoelectric converter 1302. The photoelectric converter 1302 converts, into an electrical signal, the optical image of the object formed by the optical system 1314. The photoelectric converter 1302 is the above-described photoelectric converter 1. The image preprocessing unit 1315 performs predetermined signal processing for the signal output from the photoelectric converter 1302. The function of the image preprocessing unit 1315 may be incorporated in the photoelectric converter 1302. In the photoelectric conversion system 1301, at least two sets of the optical systems 1314, the photoelectric converters 1302, and the image preprocessing units 1315 are arranged, and an output from the image preprocessing unit 1315 of each set is input to the integrated circuit 1303.

The integrated circuit 1303 is an image sensing system application specific integrated circuit, and includes an image processing unit 1304 with a memory 1305, an optical distance measurement unit 1306, a distance measurement calculation unit 1307, an object recognition unit 1308, and an abnormality detection unit 1309. The image processing unit 1304 performs image processing such as development processing and defect correction for the output signal from each image preprocessing unit 1315. The memory 1305 temporarily stores a sensed image, and stores the position of a defect in the sensed image. The optical distance measurement unit 1306 performs focusing or distance measurement of an object. The distance measurement calculation unit 1307 calculates distance measurement information from a plurality of image data acquired by the plurality of photoelectric converters 1302. The object recognition unit 1308 recognizes objects such as a vehicle, a road, a road sign, and a person. Upon detecting an abnormality of the photoelectric converter 1302, the abnormality detection unit 1309 notifies a main control unit 1313 of the abnormality.

The integrated circuit 1303 may be implemented by dedicated hardware, a software module, or a combination thereof. Alternatively, the integrated circuit may be implemented by an FPGA (Field Programmable Gate Array), an ASIC (Application Specific Integrated Circuit), or a combination thereof.

The main control unit 1313 comprehensively controls the operations of the photoelectric conversion system 1301, vehicle sensors 1310, a control unit 1320, and the like. A method in which the photoelectric conversion system 1301, the vehicle sensors 1310, and the control unit 1320 each individually include a communication interface and transmit/receive control signals via a communication network (for example, CAN standards) may be adopted without providing the main control unit 1313.

The integrated circuit 1303 has a function of transmitting a control signal or a setting value to each photoelectric converter 1302 by receiving the control signal from the main control unit 1313 or by its own control unit.

The photoelectric conversion system 1301 is connected to the vehicle sensors 1310 and can detect the traveling state of the self-vehicle such as the vehicle speed, the yaw rate, and the steering angle, the external environment of the self-vehicle, and the states of other vehicles and obstacles. The vehicle sensors 1310 also serve as a distance information acquisition unit that acquires distance information to a target object. Furthermore, the photoelectric conversion system 1301 is connected to a driving support control unit 1311 that performs various driving support operations such as automatic steering, adaptive cruise control, and anti-collision function. More specifically, with respect to a collision determination function, based on the detection results from the photoelectric conversion system 1301 and the vehicle sensors 1310, a collision with another vehicle or an obstacle is estimated or the presence/absence of a collision is determined. This performs control to avoid a collision when the collision is estimated or activates a safety apparatus at the time of a collision.

Furthermore, the photoelectric conversion system 1301 is also connected to an alarming device 1312 that generates an alarm to the driver based on the determination result of a collision determination unit. For example, if the determination result of the collision determination unit indicates that the possibility of a collision is high, the main control unit 1313 performs vehicle control to avoid a collision or reduce damage by braking, releasing the accelerator pedal, or suppressing the engine output. The alarming device 1312 sounds an alarm such as a sound, displays alarming information on the screen of a display unit such as a car navigation system or a meter panel, applies a vibration to the seat belt or a steering wheel, thereby giving an alarm to the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-016893, filed Feb. 4, 2021, which is hereby incorporated by reference herein in its entirety.

What is claimed is:

1. A photoelectric converter comprising:
a pixel array including a plurality of pixels;
a capacitive coupling amplifier configured to amplify a signal output from the pixel array; and
a delta-sigma AD converter configured to convert, into a digital signal, an analog signal output from the amplifier,
wherein the amplifier is formed by a plurality of first elements including an active element and a capacitive element,
the delta-sigma AD converter is formed by a plurality of second elements including an active element and a capacitive element, and
a breakdown voltage of at least one of the plurality of second elements forming the delta-sigma AD converter is lower than a breakdown voltage of the plurality of first elements forming the amplifier.

2. The converter according to claim 1, wherein a maximum voltage applied to the at least one second element is lower than a maximum voltage applied to the plurality of first elements.

3. The converter according to claim 1, wherein the at least one second element of the delta-sigma AD converter includes a gate oxide film thinner than a gate oxide film of at least one of the plurality of first elements forming the amplifier.

4. The converter according to claim 1, wherein at least one of the plurality of first elements forming the amplifier includes a diffusion capacitance, and the at least one second element forming the delta-sigma AD converter includes at least one of an MIM capacitance and an MOM capacitance.

5. The converter according to claim 1, wherein at least one of the plurality of first elements forming the amplifier includes a diffusion capacitance, the at least one second element forming the delta-sigma AD converter is formed by opposite patterns, and the patterns include metallic patterns or metallized patterns.

6. The converter according to claim 1, wherein the delta-sigma AD converter includes a subtracter, an integrator, a quantizer, a DA converter, and a decimation filter.

7. The converter according to claim 6, wherein a breakdown voltage of at least the second element forming the decimation filter among the plurality of second elements is lower than a breakdown voltage of the plurality of first elements forming the amplifier.

8. The converter according to claim 6, wherein a breakdown voltage of at least the second element forming the quantizer among the plurality of second elements is lower than a breakdown voltage of the plurality of first elements forming the amplifier.

9. The converter according to claim 6, wherein a breakdown voltage of at least the second element forming the integrator among the plurality of second elements is lower than a breakdown voltage of the plurality of first elements forming the amplifier.

10. The converter according to claim 6, wherein a breakdown voltage of at least the second element forming the DA converter among the plurality of second elements is lower than a breakdown voltage of the plurality of first elements forming the amplifier.

11. The converter according to claim 6, wherein a breakdown voltage of at least the second element forming the subtracter among the plurality of second elements is lower than a breakdown voltage of the plurality of first elements forming the amplifier.

12. The converter according to claim 6, wherein the integrator is a voltage integrator.

13. The converter according to claim 6, wherein the integrator is a current integrator.

14. The converter according to claim 1, wherein the delta-sigma AD converter includes a first integrator configured to integrate a current supplied to an input node of the delta-sigma AD converter, a voltage-current converter configured to convert a voltage of the input node into a current, a second integrator configured to integrate a current supplied to an intermediate node connected to an output of the voltage-current converter, a quantizer configured to quantize a voltage of the intermediate node, a first DA converter configured to extract a predetermined current from the input node in accordance with an output from the quantizer, a second DA converter configured to extract a predetermined current from the intermediate node in accordance with the output from the quantizer, and a decimation filter configured to receive the output from the quantizer.

15. The converter according to claim 14, wherein a breakdown voltage of at least a second element, which forms the decimation filter, among the plurality of second elements is lower than a breakdown voltage of the plurality of first elements forming the amplifier.

16. The converter according to claim 14, wherein a breakdown voltage of at least a second element, which forms the quantizer, among the plurality of second elements is lower than a breakdown voltage of the plurality of first elements forming the amplifier.

17. The converter according to claim 14, wherein breakdown voltages of at least second elements, which form the first integrator and the second integrator, among the plurality of second elements are lower than a breakdown voltage of the plurality of first elements forming the amplifier.

18. The converter according to claim 14, wherein a breakdown voltage of at least second elements, which form the first DA converter and the second DA converter, among the plurality of second elements are lower than a breakdown voltage of the plurality of first elements forming the amplifier.

19. The converter according to claim 1, further comprising a clip circuit configured to clip the output from the amplifier.

20. The converter according to claim 1, wherein
the plurality of first elements of the amplifier include a first element forming an amplifier circuit, and a first capacitive element arranged between an input node of the amplifier and an input node of the amplifier circuit,
the plurality of second elements of the delta-sigma AD converter include a second capacitive element configured to be charged with a current supplied to an input node of the delta-sigma AD converter, and
a capacitance value of the second capacitive element is smaller than a capacitance value of the first capacitive element.

21. The converter according to claim 1, wherein a total sum of capacitance values of the capacitive elements among the plurality of second elements of the delta-sigma AD converter is smaller than a total sum of capacitance values of the capacitive elements among the plurality of first elements of the amplifier.

22. The converter according to claim 1, wherein a minimum value of capacitance values of all the capacitive elements of the delta-sigma AD converter is smaller than a minimum value of capacitance values of all the capacitive elements of the amplifier.

23. A photoelectric conversion system comprising:
a photoelectric converter defined in claim 1; and
a signal processing unit configured to process a signal output from the photoelectric converter.

24. A moving body comprising:
a photoelectric converter defined in claim 1; and
a signal processing unit configured to process a signal output from the photoelectric converter.

25. A semiconductor substrate comprising:
a capacitive coupling amplifier configured to amplify a signal output from a pixel array including a plurality of pixels; and
a delta-sigma AD converter configured to convert, into a digital signal, an analog signal output from the amplifier,
wherein the amplifier is formed by a plurality of first elements including an active element and a capacitive element,
the delta-sigma AD converter is formed by a plurality of second elements including an active element and a capacitive element, and
a breakdown voltage of at least one of the plurality of second elements forming the delta-sigma AD converter is lower than a breakdown voltage of the plurality of first elements forming the amplifier.

* * * * *